US006810325B2

(12) United States Patent
Amano et al.

(10) Patent No.: US 6,810,325 B2
(45) Date of Patent: Oct. 26, 2004

(54) POSITION LOCATING SYSTEM, SERVER, POSITION LOCATING METHOD, AND PROGRAM

(75) Inventors: Kouji Amano, Tokyo (JP); Takashi Nozaki, Tokyo (JP)

(73) Assignees: Pioneer Corporation, Tokyo (JP); Increment P Corporation, Tokyo (JP)

( * ) Notice: Subject to any disclaimer, the term of this patent is extended or adjusted under 35 U.S.C. 154(b) by 0 days.

(21) Appl. No.: 10/352,212

(22) Filed: Jan. 28, 2003

(65) Prior Publication Data

US 2003/0144792 A1 Jul. 31, 2003

(30) Foreign Application Priority Data

Jan. 30, 2002 (JP) .................................... P. 2002-021336
Jan. 30, 2002 (JP) .................................... P. 2002-021359

(51) Int. Cl.[7] ............................................... G01C 21/30
(52) U.S. Cl. ....................... 701/207; 701/208; 340/988; 340/989; 340/991; 340/993; 342/357.01; 342/357.09; 342/357.1; 455/456.1; 455/456.6
(58) Field of Search ................................ 340/988–993; 701/207–213; 455/456.1, 456.2, 456.3, 456.5, 456.6, 457, 517, 421; 342/257.01, 357.06, 357.07, 357.09, 357.13

(56) References Cited

U.S. PATENT DOCUMENTS

| | | | | | |
|---|---|---|---|---|---|
| 5,742,509 | A | * | 4/1998 | Goldberg et al. | 701/211 |
| 6,131,067 | A | * | 10/2000 | Girerd et al. | 701/213 |
| 6,377,210 | B1 | * | 4/2002 | Moore | 342/357.13 |
| 6,510,381 | B2 | * | 1/2003 | Grounds et al. | 701/207 |
| 6,532,417 | B2 | * | 3/2003 | Hatano | 701/207 |
| 6,615,134 | B2 | * | 9/2003 | Ando | 701/209 |
| 2001/0005809 | A1 | * | 6/2001 | Ito | 701/210 |
| 2002/0086681 | A1 | * | 7/2002 | Gilham et al. | 455/456 |
| 2002/0103781 | A1 | * | 8/2002 | Mori et al. | 707/1 |
| 2002/0158778 | A1 | * | 10/2002 | Flick | 340/988 |
| 2002/0174360 | A1 | * | 11/2002 | Ikeda | 713/200 |

FOREIGN PATENT DOCUMENTS

| | | |
|---|---|---|
| EP | 1 132 881 A2 | 9/2001 |
| EP | 1 152 219 A1 | 11/2001 |
| JP | 10-032866 | 2/1998 |
| JP | 10-081205 | 3/1998 |
| JP | 11-230763 | 8/1999 |
| JP | 11-268615 | 10/1999 |
| JP | 2001-010448 | 1/2001 |

* cited by examiner

*Primary Examiner*—Jacques H. Louis-Jacques
(74) *Attorney, Agent, or Firm*—Morgan, Lewis & Bockius, LLP

(57) ABSTRACT

A server includes a position estimation section for estimating the current position of a client apparatus based on the already acquired position information when the server cannot acquire position information from the client apparatus and the server requests the client apparatus to transmit position information in response to a search instruction from an information terminal.

18 Claims, 11 Drawing Sheets

POSITION LOCATING SYSTEM, SERVER, POSITION LOCATING METHOD, AND PROGRAM

The present disclosure relates to the subject matter contained in Japanese Patent Application No.2002-021336 filed on Jan. 30, 2002 and Japanese Patent Application No.2002-021359 filed on Jan. 30, 2002, which are incorporated herein by reference in its entirety.

BACKGROUND OF THE INVENTION

1. Field of the Invention

This invention relates to position locating for locating the position of a mobile unit such as a moving vehicle or a person and in particular to a position information transmission apparatus installed in a mobile unit for transmitting position information provided by detecting the position of the apparatus to the outside, a position information transmission method, and a program. This invention also relates to a position locating system, a server, a position locating method, and a program for locating the position of a moving vehicle, a person, etc.

2. Description of the Related Art

In recent years, a position locating system using position detection means such as GPS (Global Positioning System) and base station information of PHS and a mobile telephone to locate the position of a moving vehicle, a person, etc., has been used. For example, as a system for a third party at another location to check the position of an arbitrary object, position locating service or the like is available wherein a mobile terminal having a GPS function is installed in a vehicle or a person and a management service company of the mobile terminal acquires position information in response to demand for providing position information from a client (third party) and transmits the position information to the mobile telephone or PC terminal of the client. The client can check the current position of the objective person or vehicle on a map displayed on a display of the mobile telephone, the PC terminal, etc., and a mark shown in the map.

Since the position locating system detects the position by radio wave and also uses radio wave when obtained position information is transmitted to another location, it becomes impossible to conduct communications in a location at which radio wave does not arrive (for example, tunnel, underground parking lot, dead space area of radio telephone network, etc.,) and it is made impossible to acquire the position information; this is a problem of the position locating system. Specifically in the example of the position locating service, when the client sends the demand for providing position information, if the vehicle already enters a communication-impossible location as mentioned above, a situation in which the position of the object cannot be located at all occurs.

As described above, the position locating system in the related art transmits the position information by radio wave and locates the current position based only on the position information. Thus, if the object enters a communication-impossible location and the position information from the object cannot be acquired, it is made entirely impossible to locate the position.

However, when the object needs always to be tracked as the purpose of locating the position is to find out a stolen vehicle or to care for a person, if the object enters a communication-impossible location and it is made impossible to locate the position of the object, it is fatal.

Also, in such a system, the position information is transmitted at a predetermined frequency from the client apparatus to the server. Preferably, the transmission frequency is high to improve the position locating accuracy, but the transmission cost is increased. Thus in fact, the position information is transmitted every expiration of a predetermined time or each time the mobile unit moves a predetermined distance.

However, if the position information transmission frequency is determined simply by the expiration of the time or the traveled distance, the number of pieces of position information that can be acquired varies depending on the move circumstances of the mobile unit or an excessive amount of position information is transmitted; this is a problem.

For example, with a client apparatus set so as to transmit position information every minute, a mobile unit running at 30 km/h and a mobile unit running at 60 km/h differ twice in the interval between the positions located every transmission.

FIG. 13 shows the above-described circumstances and is a schematic drawing to show the search result displayed on a display of the operator who makes a position search. On the map, a move history of the mobile unit is displayed. The position progression of the mobile unit running at 30 km/h is displayed at small intervals (FIG. 13(*a*)), but the position progression of the mobile unit running at 60 km/h is displayed at larger intervals (FIG. 13(*b*)) and the number of pieces of position information that can be acquired at a given distance is lessened. The higher the run speed, the more remarkable the circumstances. In contrast, if the speed is low as in a city, etc., display is produced as in FIG. 13(*c*). That is, an excessive amount of position information is transmitted even at a short move distance, resulting in waste of the communication cost.

To solve the problem as in FIG. 13(*c*), setting of transmitting position information every predetermined traveled distance is considered to be effective, but also involves a problem. For example, with a client apparatus set so as to transmit position information every km of traveled distance, for example, if the mobile unit almost stops because of a traffic jam, position information is not transmitted over a long time and thus the server cannot acquire position information; if the mobile unit runs at extremely high speed on a freeway, etc., position information is frequently transmitted, thus resulting in waste of the communication cost.

If only the expiration of a predetermined time or only a predetermined move distance is used as the reference of the position information transmission frequency as described above, the number of pieces of position information that can be acquired varies depending on the move speed of the mobile unit and the communication cost is also wasted.

In recent years, a system has been known for locating the position of a mobile unit based on the already acquired position information in a server if position information from the mobile unit cannot be acquired because the radio wave condition is poor. Since such a system estimates the current position of the mobile unit from the history of a plurality of pieces of position information already acquired before the position information from the mobile unit stops dead, if the number of pieces of position information that can be acquired varies depending on the move circumstances of the mobile unit, precise position estimation cannot be conducted and the estimation accuracy becomes poor; this is a problem.

SUMMARY OF THE INVENTION

It is therefore an object of the invention to provide a position locating system, a server, a position locating method, and a program for making it possible to locate the position of an object by estimating the position of the object even if position information from the object whose position is to be located cannot be acquired.

It is also another object of the invention to provide a position information transmission apparatus for changing the transmission frequency of position information of the apparatus in response to the move circumstances of the mobile unit installing the position information transmission apparatus and enabling a server to always acquire constant position information independently of the move circumstances of the mobile unit, a position information transmission method, and a program.

According to the invention, there is provided a position locating system including a client apparatus (client apparatus 1) for detecting current position of the client apparatus and transmitting obtained position information at a predetermined frequency, an information terminal (information terminal 3) for transmitting an instruction for searching for the current position of the client apparatus, and a server (server 2) for receiving the current position search instruction from the information terminal and transmitting map image data containing the current position of the client apparatus to the information terminal based on the position information transmitted from the client apparatus. The server includes a position estimation section (position estimation section 25) for estimating the current position of the client apparatus based on the already acquired position information when the server cannot acquire the position information from the client apparatus and the server requests the client apparatus to transmit position information in response to the search instruction from the information terminal.

According to the invention, there is provided a server (server 2) including a transmission-reception section (transmission-reception section 21) for receiving position information from a client apparatus at a predetermined frequency, receiving a position search instruction from an information terminal, and transmitting map image data containing current position of the client apparatus to the information terminal, a position locating processing section (system control section 20) for generating the map image data containing the current position of the client apparatus located based on the position information transmitted from the client apparatus, and a position estimation section (position estimation section 25) for generating the map image data containing the current position of the client apparatus estimated based on the already acquired position information when the position information from the client apparatus cannot be acquired and the client apparatus is requested to transmit position information in response to the search instruction from the information terminal.

According to the invention, there is provided a position locating method comprising a position information transmission step (S106) wherein a client apparatus detects the current position of the client apparatus and transmits obtained position information at a predetermined frequency; a search instruction transmission step (S301) wherein an information terminal transmits an instruction for searching for the current position of the client apparatus; a position information estimation step (S405) wherein a server receives the current position search instruction from the information terminal, requests the client apparatus to transmit position information, locates the current position of the client apparatus based on the position information transmitted from the client apparatus, and estimates the current position of the client apparatus based on the already acquired position information if the server cannot acquire position information from the client apparatus when the server requests the client apparatus to transmit position information in response to the current position search instruction; and a position information transmission step (S406) of transmitting map image data containing the current position of the client apparatus located or estimated in the server to the information terminal.

According to the invention, there is provided a position locating method executed by a server comprising a position information estimation step (S401 to S405) of receiving a current position search instruction from an information terminal, requesting a client apparatus to transmit position information, locating the current position of the client apparatus based on the position information transmitted from the client apparatus, and estimating the current position of the client apparatus based on the already acquired position information if position information from the client apparatus cannot be acquired when the client apparatus is requested to transmit position information in response to the current position search instruction; and a position information transmission step (S406) of transmitting map image data containing the located or estimated current position of the client apparatus to the information terminal.

According to the invention, there is provided a program executed by a server for causing a computer to function as a transmission-reception section for receiving position information from a client apparatus at a predetermined frequency and receiving a position search instruction from an information terminal and transmitting map image data containing the current position of the client apparatus to the information terminal, a position locating processing section for generating the map image data containing the current position of the client apparatus located based on the position information transmitted from the client apparatus, and a position estimation section for generating the map image data containing the current position of the client apparatus estimated based on the already acquired position information when the position information from the client apparatus cannot be acquired and the client apparatus is requested to transmit position information in response to the search instruction from the information terminal.

According to the invention, even if the position information cannot be acquired from the client apparatus whose position is to be located, the server estimates the current position of the client apparatus based on the already acquired position information, so that it is made possible to locate the position of the object.

According to the invention, there is provided a position information transmission apparatus being installed in a mobile unit for detecting the position of the apparatus and transmitting acquired position information to a server for locating the position of the apparatus, the position information transmission apparatus a position information transmission frequency setting section (position information transmission frequency setting section 20) for setting transmission frequency of the position information in response to move speed of the mobile unit.

According to the invention, there is provided a position information transmission method for detecting the position of a mobile unit and transmitting acquired position information to a server for locating the position of the mobile unit, the position information transmission method comprising a speed determination step (S102) of determining move speed of the mobile unit; and a transmission frequency setting step (S103, S105, S107, S109) of setting transmission frequency of the position information in response to the move speed of the mobile unit.

According to the invention, there is provided a program for detecting the position of a mobile unit and transmitting acquired position information to a server for locating the position of the mobile unit, said program for causing a computer to function as a section for determining move speed of the mobile unit, and section for setting transmission frequency of the position information in response to the move speed of the mobile unit.

According to the above-described configuration, the position information is transmitted based on the transmission frequency set in response to the move speed of the mobile unit and thus can be transmitted at the optimum frequency responsive to the move circumstances, so that the server can always acquire constant position information independently of the move circumstances.

DETAILED DESCRIPTION OF THE PREFERRED EMBODIMENTS

Referring now to the accompanying drawings, there is shown a preferred embodiment of the invention.

Figure 1:
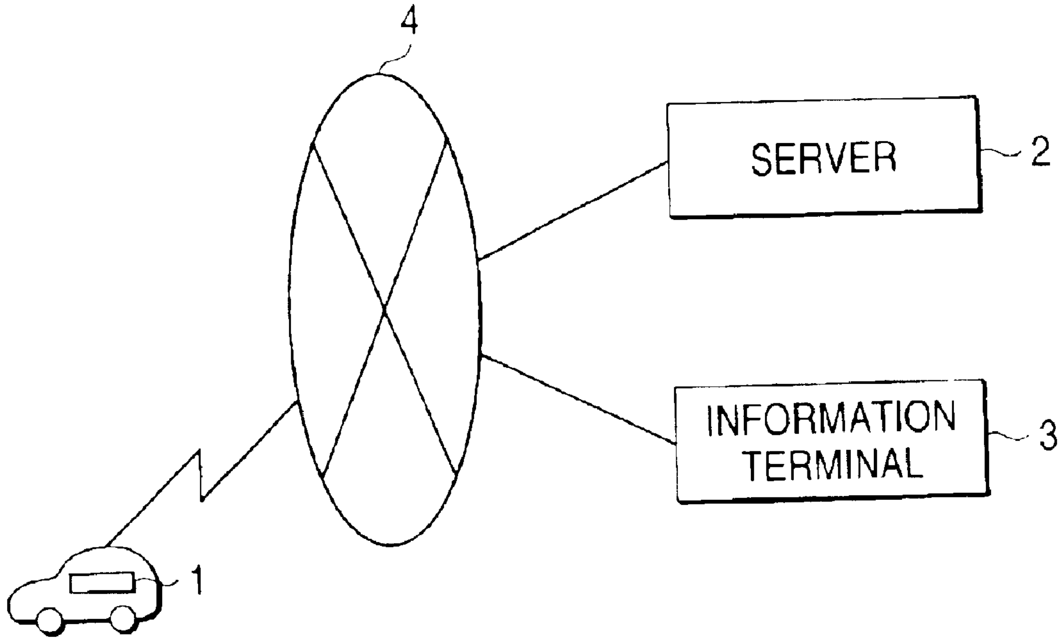
FIG. 1 is a diagram to show the configuration of a position locating system according to one embodiment of the invention.

FIG. 1 is a diagram to show the configuration of a position locating system in one embodiment of the invention.

As shown in FIG. 1, the position locating system includes a client apparatus 1 (position information transmission apparatus), a server 2, and an information terminal 3, each of which is connected to Internet 4. The client apparatus 1 is the unit whose position is to be located; in the embodiment, it is installed in a vehicle for detecting the position of the vehicle installing the client apparatus 1 and transmitting position information to the server 2 at a predetermined frequency. The server 2 is an apparatus for locating the current position of the client apparatus based on the position information transmitted from the client apparatus 1. The information terminal 3 is an apparatus for giving a position search instruction of the client apparatus 1 to the server 2. When the information terminal 3 issues a search instruction, the server 2, upon reception of the instruction, transmits map image data containing the current position of the client apparatus located based on the position information of the client apparatus 1 to the information terminal 3; when the server 2 cannot locate the position, it transmits map image data containing the current position of the client apparatus estimated based on map information concerning position, facilities, etc., and the most recent position information to the information terminal 3.

Next, the configurations of the client apparatus 1, the server 2, and the information terminal 3 making up the position locating system in the embodiment will be discussed.

Figure 2:
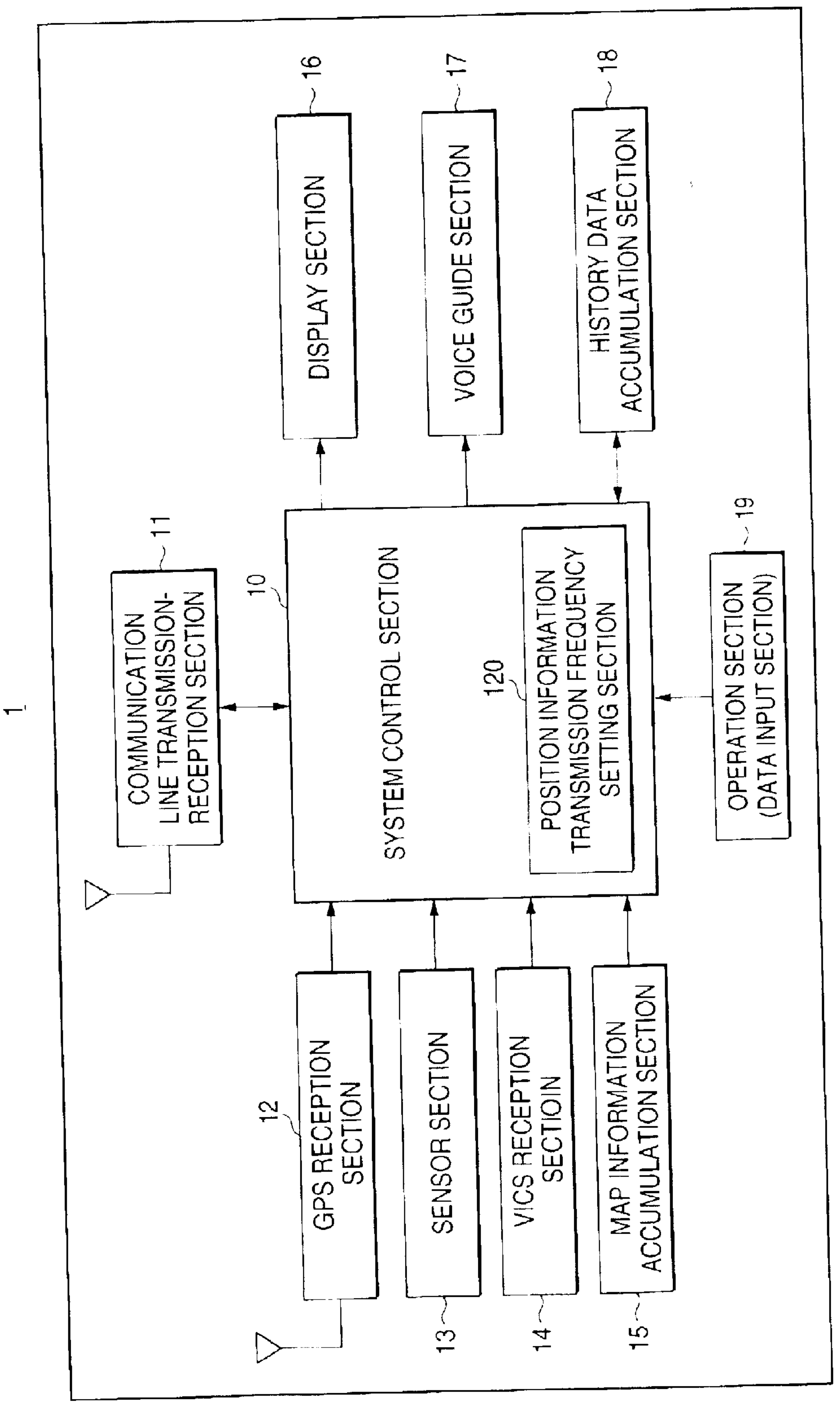
FIG. 2 is a block diagram to show the configuration of a client apparatus forming a part of the position locating system according to the embodiment of the invention.

FIG. 2 is a block diagram to show the configuration of the client apparatus 1. The client apparatus 1 includes a system control section 10 implemented as a computer mainly containing a microprocessor, semiconductor memory, and various interface circuits, a transmission-reception section 11 having a transmitter and a receiver, a GPS reception section 12, a sensor section 13 having a vehicle speed sensor, etc., a VICS reception section 14, a map information accumulation section 15 implemented as memory, etc., a display section 16 implemented as a liquid crystal display, etc., a voice guide section 17 implemented as a loudspeaker, etc., a history data accumulation section 18 implemented as memory, etc., and an operation section 19 having various buttons, a keyboard, etc.

The transmission-reception section 11 transmits and receives data to and from the server 2. The GPS reception section 12 outputs a position signal, the sensor section 13 outputs a measurement signal of vehicle speed, etc., and the VICS reception section 14 outputs a VICS information signal. The map information accumulation section 15 stores map information for display on the display section 16. The display section 16 and the voice guide section 17 notify the driver, etc., in the vehicle of current position information, a warning, etc. In the client apparatus 1 (position information transmission apparatus) of the embodiment, the GPS reception section 12 receives a position signal, for example, every second or in a necessary time period after the power is turned on. The history data accumulation section 18 stores position information obtained from the position signal received in a predetermined period. The operation section 19 accepts data entry, etc., of the operator. The system control section 10 is connected to the above mentioned sections for controlling the operations of the above mentioned sections. For example, the obtained position information received in a predetermined period at the GPS reception section 12 is stored in the history data accumulation section 18. The stored position information is transmitted from the transmission-reception section 11 to the server 2 in a predetermined period. The position information and road information received at the GPS reception section 12 and the VICS reception section 14 are displayed on the display section 16 together with the map image data stored in the map information accumulation section 15. The measurement value information provided by the sensor section 13 is also displayed on the display section 16. Further, voice guide is output from the voice guide section 17, as required, for providing information for the driver, etc., in the vehicle. The map image data in the map information accumulation section 15 may be previously recorded on a disk medium or may be data transmitted from a map information database (described later) in the server 2. The system control section 10 contains a position information transmission frequency setting section 120 for determining the position information transmission frequency based on vehicle speed information from the sensor section 13.

Figure 3:
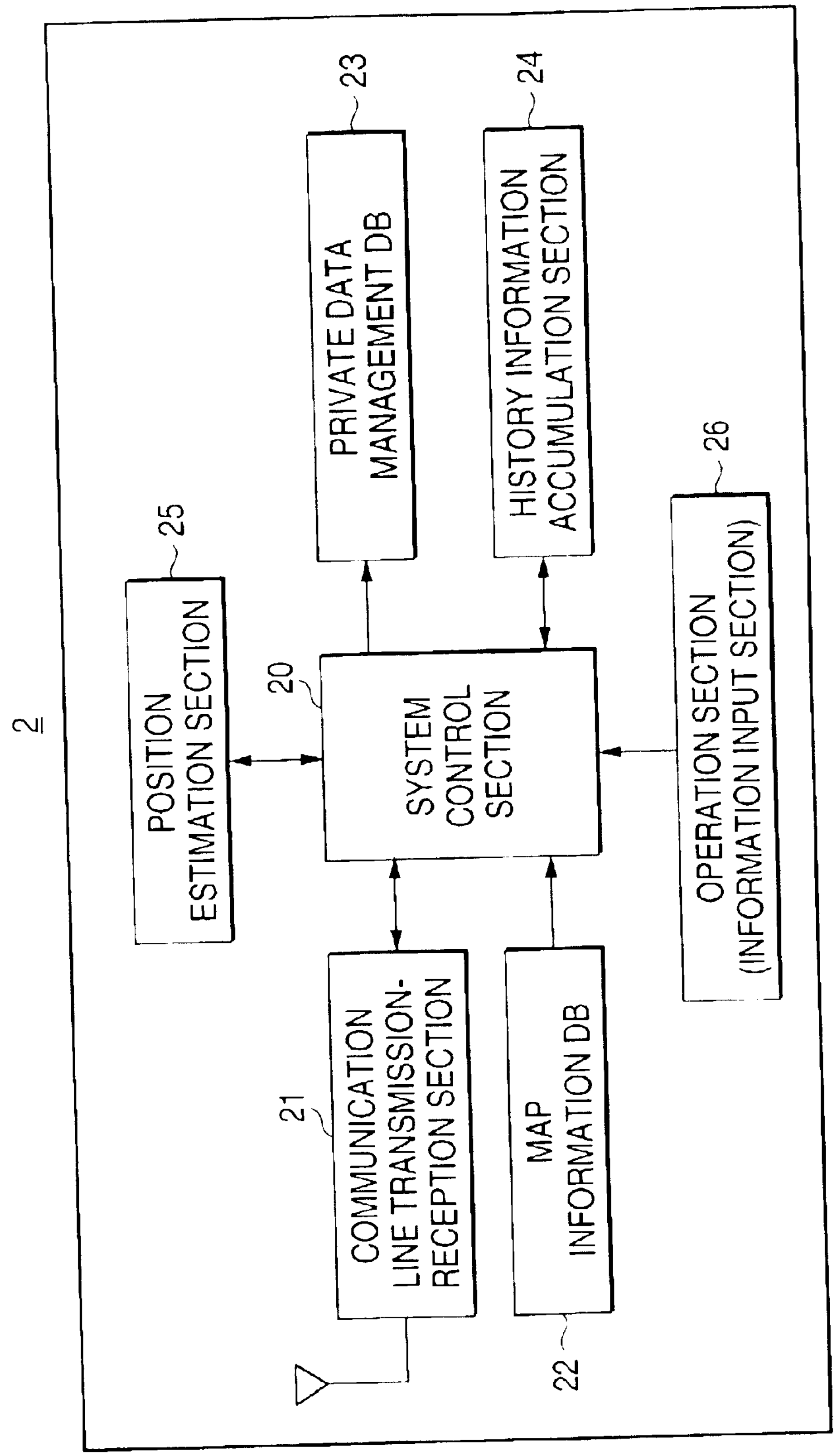
FIG. 3 is a block diagram to show the configuration of a server forming a part of the position locating system according to the embodiment of the invention.

FIG. 3 is a block diagram to show the configuration of the server 2. The server 2 includes a system control section 20 implemented as a computer mainly containing a microprocessor, semiconductor memory, and various interface circuits, a transmission-reception section 21 having a transmitter and a receiver, a map information database 22 implemented as an external storage unit, etc., a private data management database 23, a history information accumulation section 24, a position estimation section 25, and an operation section 26 having various buttons, a keyboard, etc.

Figure 4:
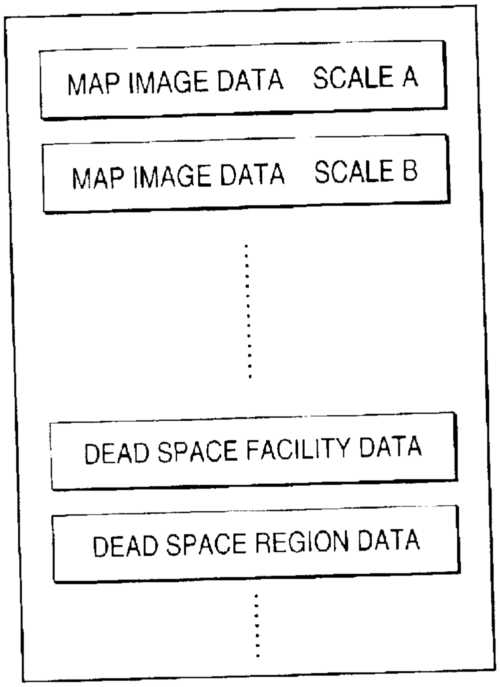
FIG. 4 is a schematic drawing to show a data configuration example of a map information database forming a part of the server.

The transmission-reception section 21 transmits and receives data to and from the client apparatus 1 and the information terminal 3. The map information database 22 stores image data of the map of each region. FIG. 4 is a schematic drawing to show the data configuration of the map information database 22. The database stores the map image data of each region on a plurality of scales. It also stores map data indicating reception failure positions (structures of tunnels, etc., and buildings of underground parking lots, etc.,) in the map area, where there is a possibility that reception of the position information from the client apparatus may stop dead. Preferably, the data is recorded on a record medium such as a CD-ROM, a DVD, or an HDD and is made able to be updated in sequence. The private data management database 23 stores data for identity management, such as the name, the password, etc., of the owner corresponding to the serial number of the client apparatus 1. The history information accumulation section 24 retains the position information acquired from the client apparatus 1. The position estimation section 25 estimates the current position of the client apparatus 1 based on the already acquired position information accumulated in the history information accumulation section 24 and the map data in the map information database 22. The operation section 26 accepts data entry, etc., of the operator. The system control section 20 is connected to the above mentioned sections for controlling the operations of the above mentioned sections. For example, upon reception of a position search instruction from the information terminal 3 at the transmission-reception section 21, the corresponding client apparatus is identified in the private data management database 23 and a request to transmit position information is sent to the identified client apparatus 1. The transmission request is transmitted from the transmission-reception section 21 to the client apparatus 1. Then, when the position information is acquired from the client apparatus 1, the map data corresponding to the position information is extracted from the map information database 22 and is transmitted from the transmission-reception section 21 to the information terminal 3 and the client apparatus 1. If the position information cannot be acquired from the client apparatus 1, the position estimation section 25 extracts the position information of the client apparatus 1 accumulated in the history information accumulation section 24. It extracts the map data corresponding to the position information from the map information database 22 and estimates the current position and then transmits the estimated current position from the transmission-reception section 21 to the information terminal 3 and the client apparatus 1. The position estimation procedure of the position estimation section 25 will be discussed later.

Figure 5:
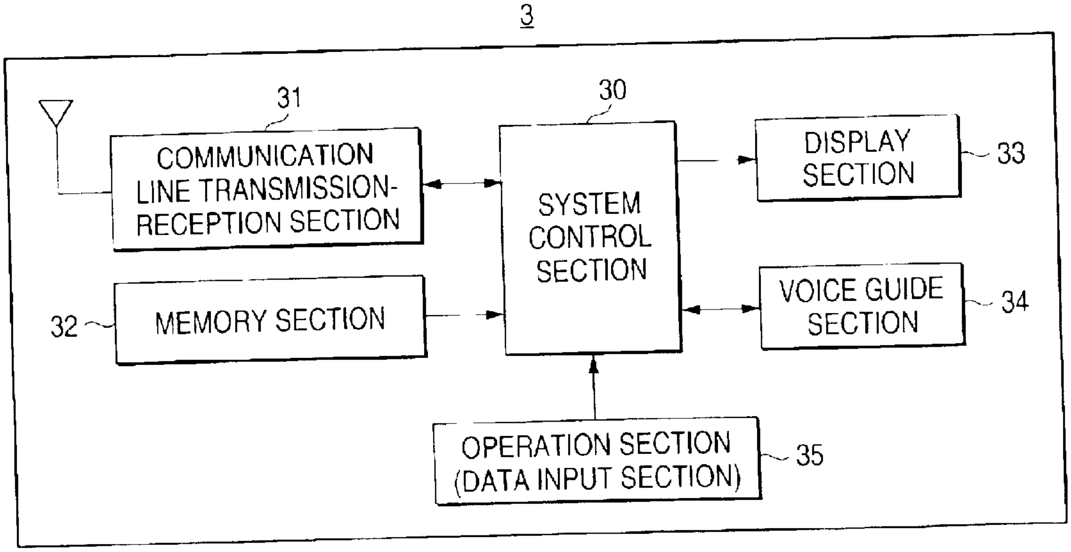
FIG. 5 is a block diagram to show the configuration of an information terminal forming a part of the position locating system according to the embodiment of the invention.

FIG. 5 is a block diagram to show the configuration of the information terminal 3. The information terminal 3 includes a system control section 30 implemented as a computer mainly containing a microprocessor, semiconductor memory, and various interface circuits, a transmission-reception section 31 having a transmitter and a receiver, a memory section 32, a display section 33 implemented as a liquid crystal display, etc., a voice guide section 34 implemented as a loudspeaker, etc., and an operation section 35 having various buttons, a keyboard, a pointing device, etc.

The transmission-reception section 31 transmits and receives data to and from the server 2. The memory section 32 temporarily stores the data transmitted and received in the transmission-reception section 31. The display section 33 and the voice guide section 34 notify the operator of the information terminal 3 of current position information of the client apparatus 1 and a warning by display and voice. The operation section 35 accepts data entry, etc., of the operator. The system control section 30 is connected to the above mentioned sections for controlling the operations of the above mentioned sections. For example, if the operator operates the operation section 35 to enter a current position search instruction of the client apparatus 1, the search instruction is transmitted from the transmission-reception section 31 to the server 2. When the server 2 makes a search for the position information and transmits the corresponding map information data, the transmission-reception section 31 receives the data and stores the data in the memory section 32. Various pieces of information stored in the memory section 32 are displayed on the display section 33. Further, voice guide is output from the voice guide section 34, as required, for providing information for the operator of the information terminal 3.

Next, the operation of the position locating system in the embodiment will be discussed with flowcharts of FIGS. 6 to 9.

Figure 6:
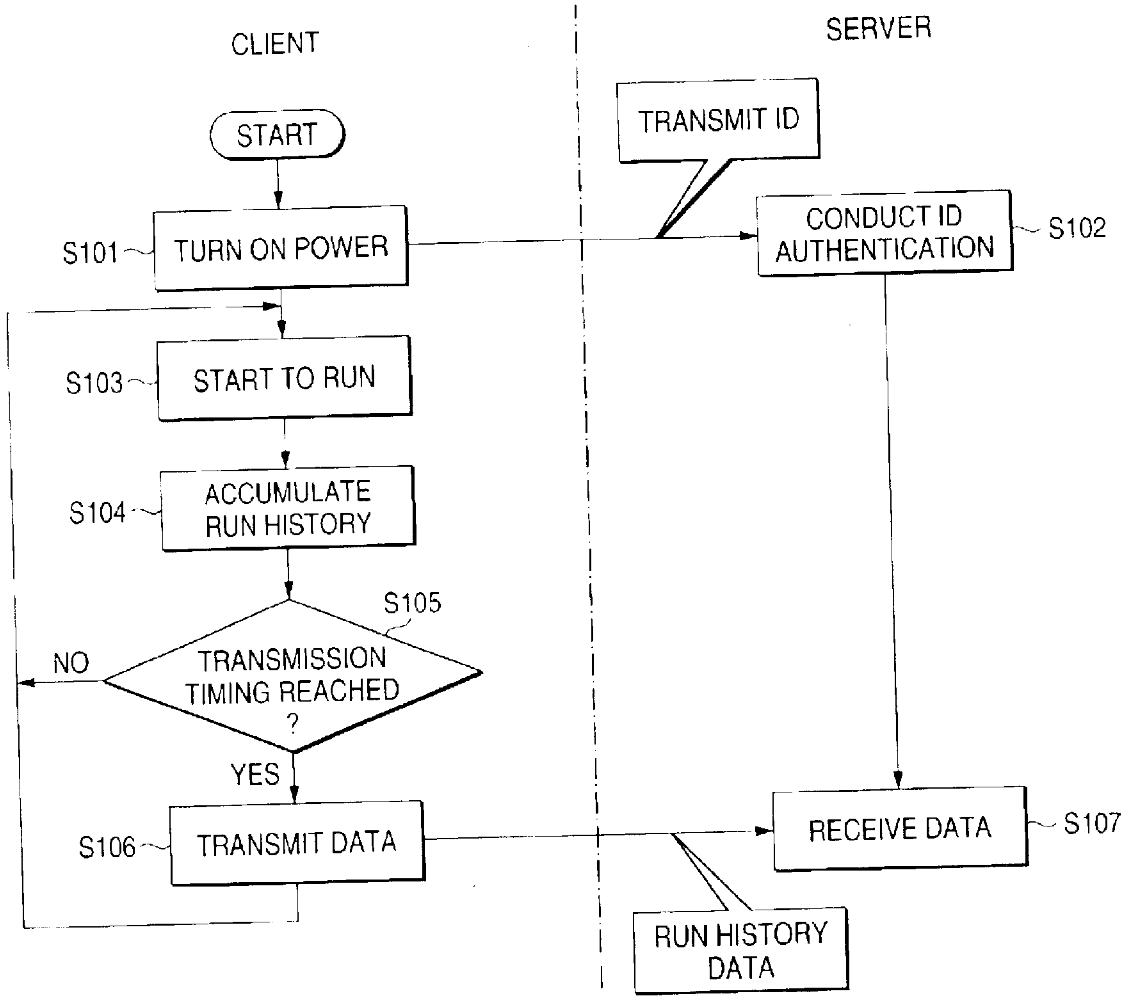
FIG. 6 is a flowchart to show the operation of the position locating system according to the embodiment of the invention (from starting of the client apparatus to position information reception of the server)

FIG. 6 is a flowchart to show a flow wherein the driver starts to drive the vehicle and the client apparatus 1 installed in the vehicle is started and transmits position information to the server 2.

To begin with, when the driver starts to drive the vehicle, power of the client apparatus 1 is turned on (step S101). The power may be turned on manually; preferably, it is turned on automatically in association with an ignition switch, for example. Just after the power is turned on, the client apparatus 1 transmits its ID from the transmission-reception section 11 to the server 2. The transmission-reception section 21 of the server 2 receives the ID and conducts ID authentication (step S102) and receives and stores the position information from the client apparatus whose ID authentication resulted in success.

When the vehicle starts to run (step S103), the client apparatus 1 receives a position signal of the running vehicle from the GPS reception section 12 in a predetermined period (for example, every second) and accumulates position information in the history data accumulation section 18 (step S104).

Whether or not a predetermined transmission timing is reached (for example, whether or not a time of 60 seconds has elapsed, whether or not the client apparatus has moved about 1 km, etc.,) is determined (step S105) and when the predetermined transmission timing is reached, the position information accumulated in the history data accumulation section 18 is transmitted to the server 2 (step S106). The server 2 receives the transmitted data (step S107) and stores the data in the history information accumulation section 24. The position locating system of the embodiment changes setting of the transmission timing in response to the move speed of the client apparatus 1. The transmission timing setting procedure will be discussed in detail with a flowchart of FIG. 7.

Figure 7:
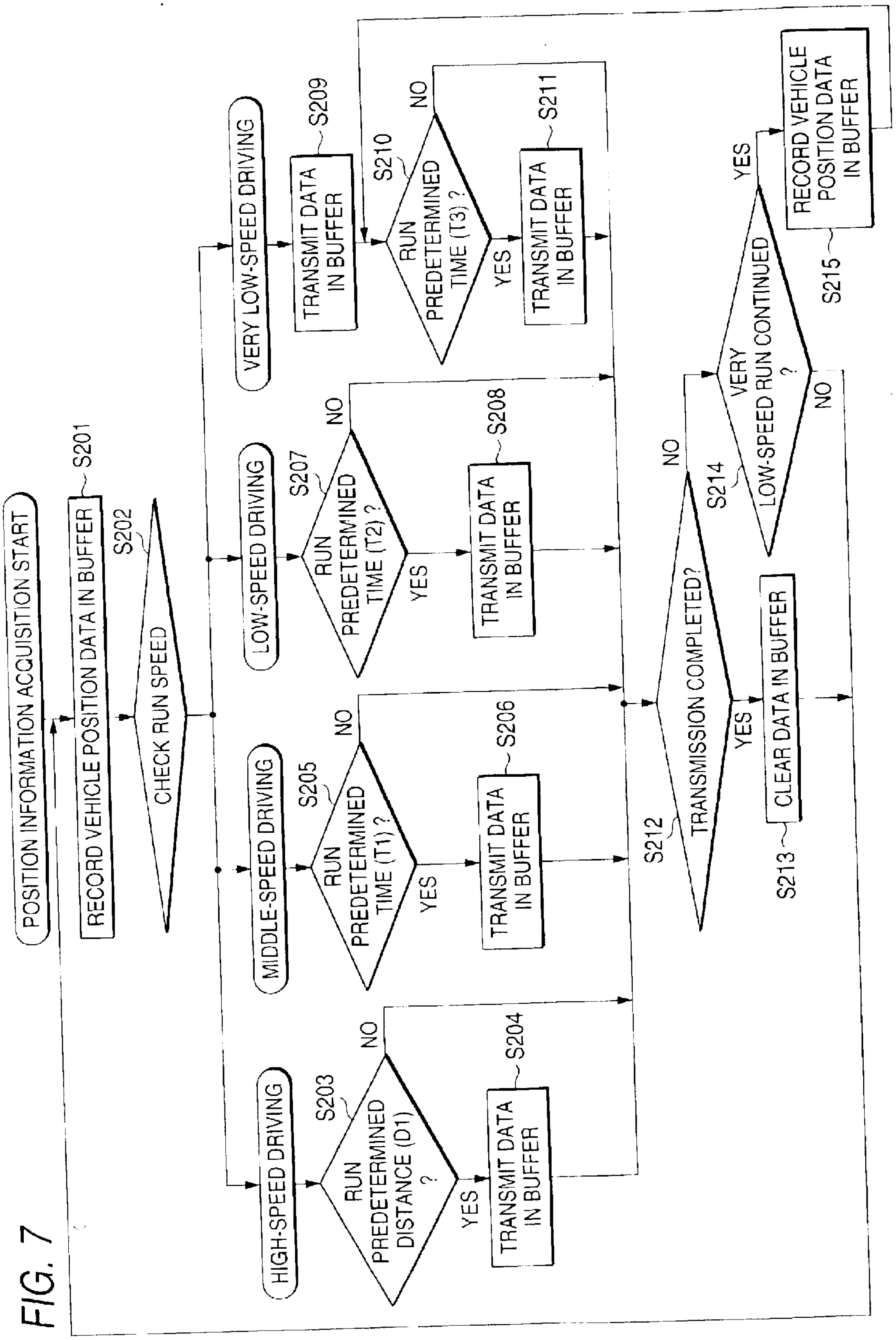
FIG. 7 is a flowchart to show the operation of the position locating system according to the embodiment of the invention (flow of determining position information transmission timing)

FIG. 7 is a flowchart to show a flow for the client apparatus 1 (position information transmission frequency setting section 120) to determine the transmission timing in response to the move speed of the client apparatus 1. To save the transmission cost, the client apparatus of the embodiment once stores the position information acquired in a predetermined period from the GPS reception section 12 in the history data accumulation section 18 and after the expiration of a predetermined time or when the vehicle runs a predetermined distance traveled (namely, when the predetermined transmission timing is reached), the position information accumulated in the history data accumulation section 18 is transmitted in batch to the server 2.

To being with, the vehicle position information acquired from the GPS reception section 12 is recorded in the history data accumulation section 18 (step S201). Next, the system control section 10 determines the current run speed from the measurement value of the vehicle speed sensor (sensor section 13) (step S202). In the embodiment, the speed is classified into four types of high-speed driving (60 km/h or more), medium-speed driving (60 to 30 km/h), low-speed driving (30 to 10 km/h), and very low-speed driving (10 km/h or less) and the position information transmission frequency is changed according to the classification. The position information is transmitted every km of traveled distance (distance reference D1) at the high-speed driving, every 60 seconds of driving time (time reference T1) at the medium-speed driving, every 40 seconds (time reference T2) at the low-speed driving, and every 20 seconds (time reference T3) at the very low-speed driving.

However, the number of speed types, the speed range, and the traveled distance and the elapsed time as the reference are not fixed as the above and may be determined arbitrarily. To transmit data from the client apparatus 1 installed in the vehicle, a radio communication network of PHS, mobile telephone, etc., is used from the vehicle to the Internet connection point and thus the priorities of the cost taken for the communications, etc., and the position locating and estimation accuracy are taken into consideration to determine the transmission frequency.

After the run speed is determined (step S202), a branch is caused to the process step responsive to the speed. When the speed is 60 km/h or more, a branch is caused to the step of high-speed driving and the position information is transmitted every km of traveled distance. At step S203, the traveled distance is determined and if the traveled distance does not reach 1 km, the process proceeds to step S212. In this case, no information is transmitted and thus the process proceeds to step S214 for determining whether or not the vehicle runs at very low speed. In this case, the vehicle runs at high speed and thus the process returns to step S201 and the second piece of vehicle position information is recorded in the history data accumulation section 18. Accordingly, the initial (0 seconds) and second (after one second) pieces of vehicle position information are recorded in the history data accumulation section 18. A similar procedure is repeated for accumulating a plurality of pieces of vehicle position information. If it is determined at step S203 that the traveled distance reaches 1 km, the information accumulated in the history data accumulation section 18 is transmitted (step S204) At step S212, the transmission is complete and thus the process proceeds to step S213 and the data in the history data accumulation section 18 is cleared. Then, the process returns to step S201 and a similar procedure is repeated for transmitting information twice, three times.

When the vehicle speed is 30 km/h or more and less than 60 km/h, a branch is caused to the step of medium-speed driving and the position information is transmitted every expiration of 60 seconds of run time. At step S205, the run time is determined and if the run time does not reach 60 seconds, the process proceeds to step S212. In this case, no information is transmitted and thus the process proceeds to step S214 for determining whether or not the vehicle runs at very low speed. In this case, the vehicle runs at medium speed and thus the process returns to step S201 and the second piece of vehicle position information is recorded in the history data accumulation section 18. Accordingly, the initial (0 seconds) and second (after one second) pieces of vehicle position information are recorded in the history data accumulation section 18. A similar procedure is repeated for accumulating a plurality of pieces of vehicle position information. If it is determined at step S205 that the run time reaches 60 seconds, the information accumulated in the history data accumulation section 18 is transmitted (step S206). At step S212, the transmission is complete and thus the process proceeds to step S213 and the data in the history data accumulation section 18 is cleared. Then, the process returns to step S201 and a similar procedure is repeated for transmitting information twice, three times.

When the vehicle speed is 10 km/h or more and less than 30 km/h, a branch is caused to the step of low-speed driving and the position information is transmitted every expiration of 40 seconds of run time. At step S207, the run time is determined and if the run time does not reach 40 seconds, the process proceeds to step S212. In this case, no information is transmitted and thus the process proceeds to step S214 for determining whether or not the vehicle runs at very low speed. In this case, the vehicle runs at low speed and thus the process returns to step S201 and the second piece of vehicle position information is recorded in the history data accumulation section 18. Accordingly, the initial (0 seconds) and second (after one second) pieces of vehicle position information are recorded in the history data accumulation section 18. A similar procedure is repeated for accumulating a plurality of pieces of vehicle position information. If it is determined at step S207 that the run time reaches 40 seconds, the information accumulated in the history data accumulation section 18 is transmitted (step S208). At step S212, the transmission is complete and thus the process proceeds to step S213 and the data in the history data accumulation section 18 is cleared. Then, the process returns to step S201 and a similar procedure is repeated for transmitting information twice, three times.

When the vehicle speed is less than 10 km/h, a branch is caused to the step of very low-speed driving and the position information is transmitted every expiration of 20 seconds of run time. At step S209, the piece of vehicle position information initially recorded in the history data accumulation section 18 is transmitted, because the vehicle may stop and thus the position information is transmitted before it is accumulated. Next, at step S210, the run time is determined and if the run time does not reach 20 seconds, the process proceeds to step S212. In this case, information is not transmitted at step S210 or later and thus the process proceeds to step S214 for determining whether or not the vehicle runs at very low speed. In this case, the vehicle runs at very low speed and thus the process proceeds to step S215 and the second piece of vehicle position information is recorded in the history data accumulation section 18. Now, the initial (0 seconds) and second (after one second) pieces of vehicle position information have been recorded in the history data accumulation section 18. Next, the run time is again determined at step S210. A similar procedure is repeated for accumulating a plurality of pieces of vehicle position information. If it is determined at step S210 that the run time reaches 20 seconds, the information accumulated in the history data accumulation section 18 is transmitted (step S211). At step S212, the transmission is complete and thus the process proceeds to step S213 and the data in the history data accumulation section 18 is cleared. Then, the process returns to step S201 and a similar procedure is repeated for transmitting information twice, three times.

The branch step flows have been described. The vehicle speed is measured in sequence and when the vehicle speed is equal to or higher than predetermined speed (high-speed driving), the transmission frequency is set based on the distance reference D1 responsive to the vehicle speed and when the vehicle speed is less than the predetermined speed (very low-speed driving to medium-speed driving), the transmission frequency is set based on the time reference T1, T2, T3 responsive to the vehicle speed, whereby the appropriate transmission frequency is determined in response to change in the vehicle speed.

The position information accumulated in the history data accumulation section 18 is transmitted in accordance with the above-described transmission frequency; a function of forcibly transmitting only the position information, which have not been transmitted to the server, of the accumulated position information as instructed from the outside is also provided.

Figure 8:
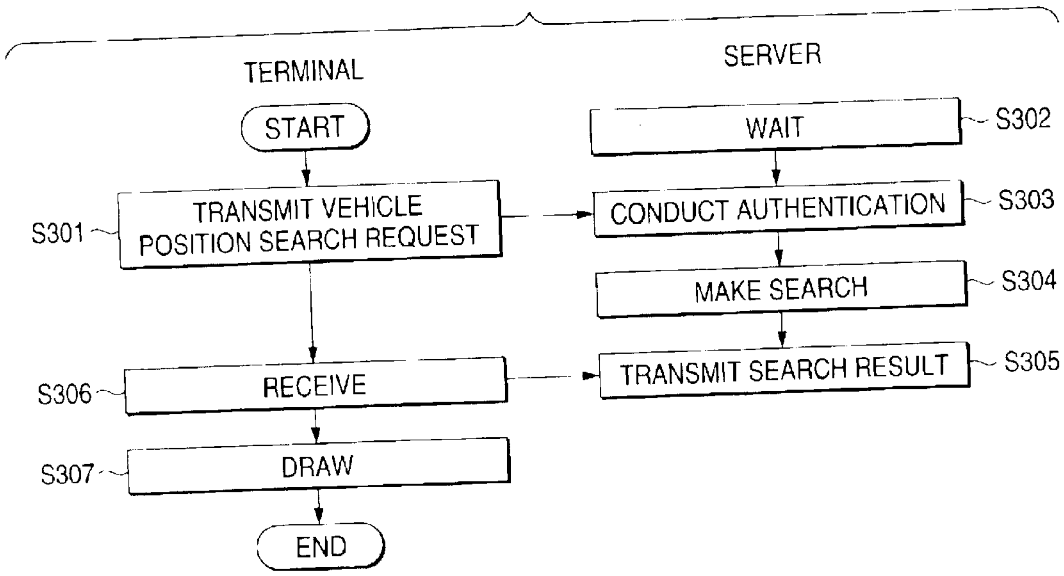
FIG. 8 is a flowchart to show the operation of the position locating system according to the embodiment of the invention (from issuing a position search information by the information terminal to reception of the search result)

FIG. 8 is a flowchart to show a procedure for the information terminal 3 to issue a current position search instruction of the client apparatus 1 and receive the search result.

To begin with, the operator of the information terminal 3 operates the operation section 35 to transmit a position search instruction of the client apparatus 1 (step S301) The server 2 waiting for a search instruction (step S302) receives the search request and determines whether or not the search request is authorized for performing authentication (step S303). If the authentication results in success, the server 2 starts to make a position search (step S304). The position search is complete and the obtained result information is transmitted to the information terminal 3 (step S305). The information terminal 3 receives the search result of the position information acquired from the history information accumulation section 24 of the server 2, the map image data acquired from the map information database 22, and the like (step S306). The map and the move history of the client apparatus 1 are displayed on the display section 33 (step S307).

At the search step (step S304), the history information accumulation section 24 of the server 2 may contain no current position information. This occurs, for example, when the vehicle enters a reception failure position where there is a possibility that reception of the position information from the client apparatus may stop dead, such as an underground parking lot, and it becomes impossible to acquire the position information from the client apparatus 1. In such a case, position estimation is performed at the search step. The position estimation is performed by the position estimation section 25 of the server 2.

Figure 9:
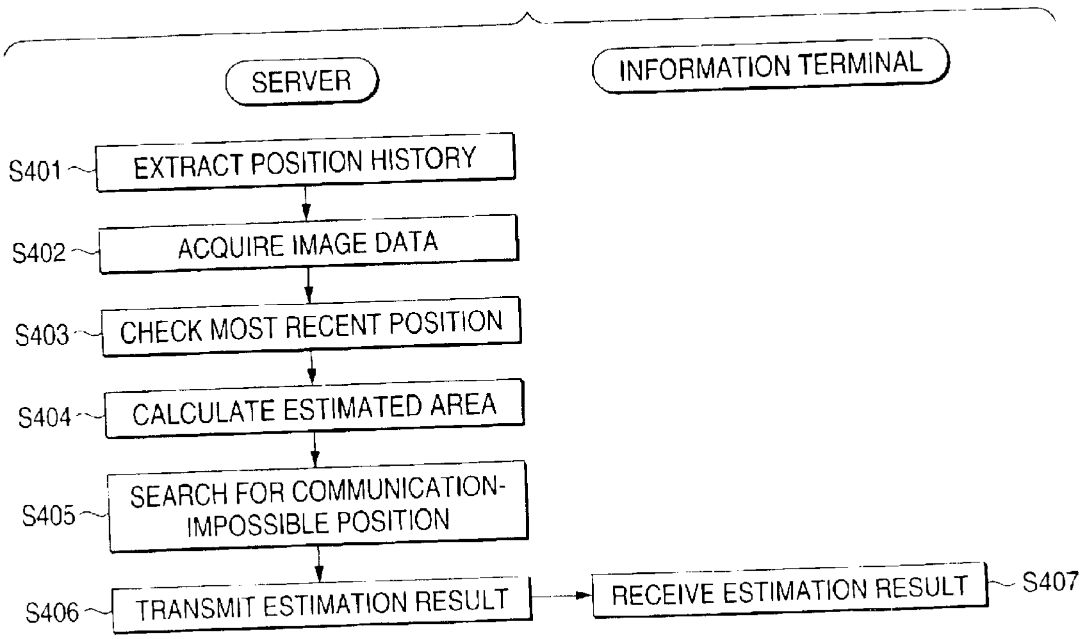
FIG. 9 is a flowchart to show the operation of the position locating system according to the embodiment of the invention (flow of position estimation)

FIG. 9 is a flowchart to show a position estimation procedure. If the system control section 20 of the server 2 determines that the history information accumulation section 24 does not contain the current position information of the client apparatus 1, the system control section 20 extracts the past position information already acquired from the history information accumulation section 24 (step S401) and causes the position estimation section 25 to execute position estimation. The position estimation section 25 acquires the map image data corresponding to the position history from the map information database 22 (step S402) and checks the most recent position last located (step S403).

Figure 10:
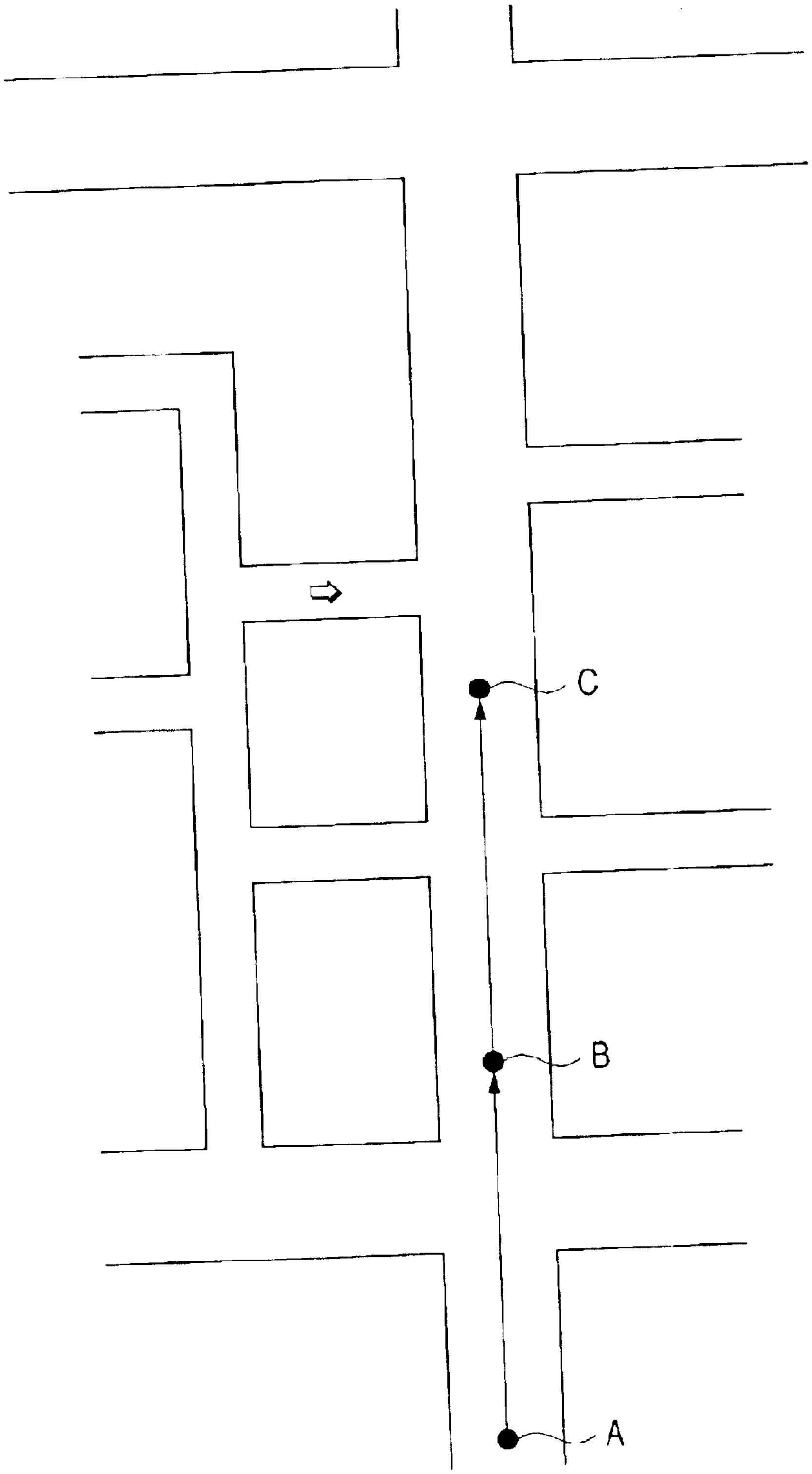
FIG. 10 is a schematic drawing on a map to show the move history of the client apparatus.

FIG. 10 is a schematic drawing to show the above-described situation and to show the move history of the client apparatus 1 on a map. In the figure, A, B, and C indicate the position history in order and the most recent position last located is C.

Figure 11:
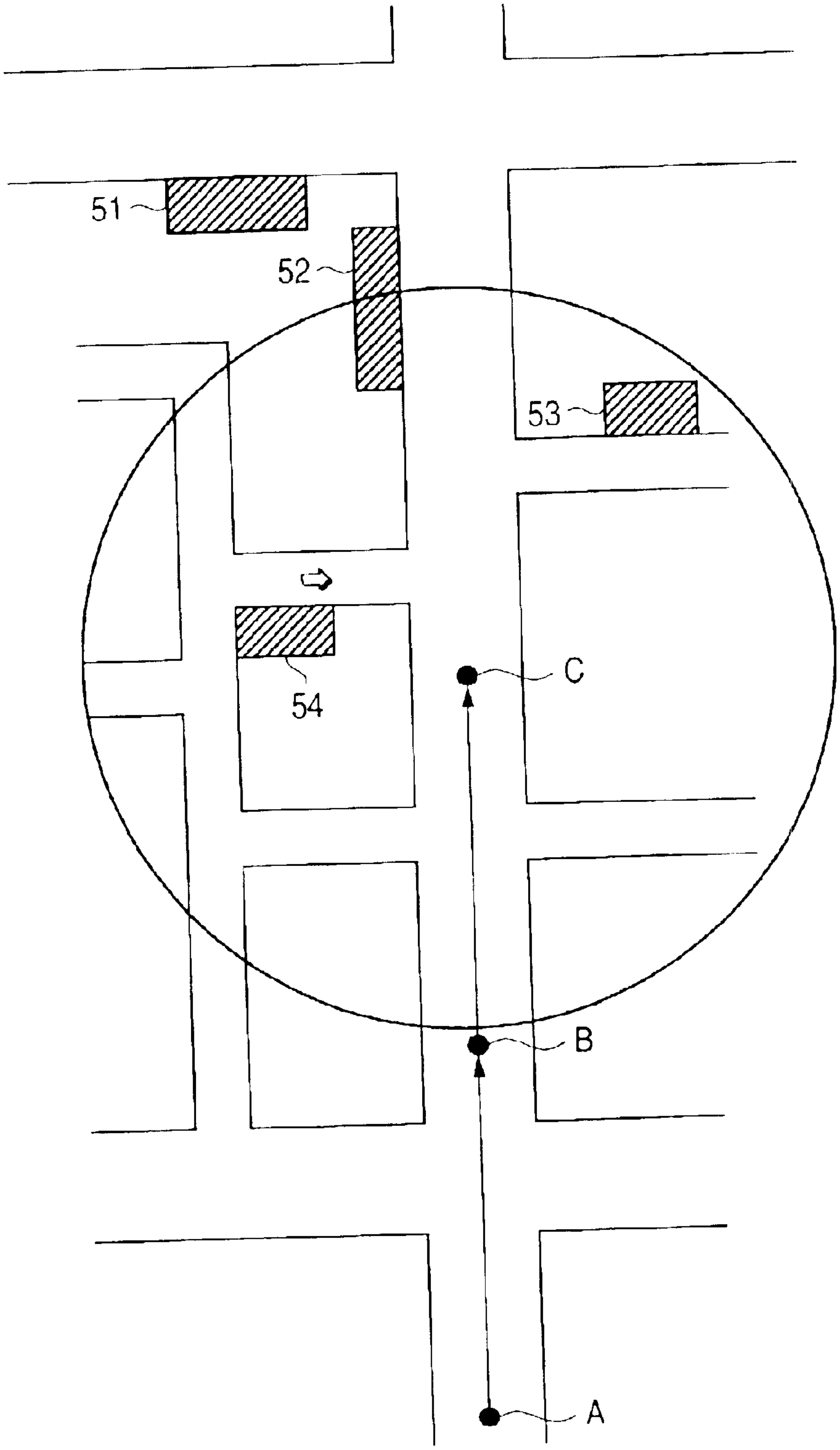
FIG. 11 is a schematic drawing on a map to show the estimated area of the current position of the client apparatus.

Next, the area where it is estimated that the client apparatus exists at present is calculated based on the history information to the most recent position (step S404). The area may be a circle with the last located position C as the center, as shown in FIG. 11. In this case, the radius of the circle is determined based on the history information to the most recent position (the distance between A and B or B and C in FIG. 10), because the maximum distance where the vehicle can move until it becomes impossible to locate a position from the most recent position that can be last located (C) is the distance between A and B or B and C in FIG. 10. However, for example, the move speed may be preset to 30 km/h in a city and 50 km/h in a suburb and the area may be determined based on it. The area may be calculated using a function with the travel direction, the speed, etc., as parameters.

Figure 12:
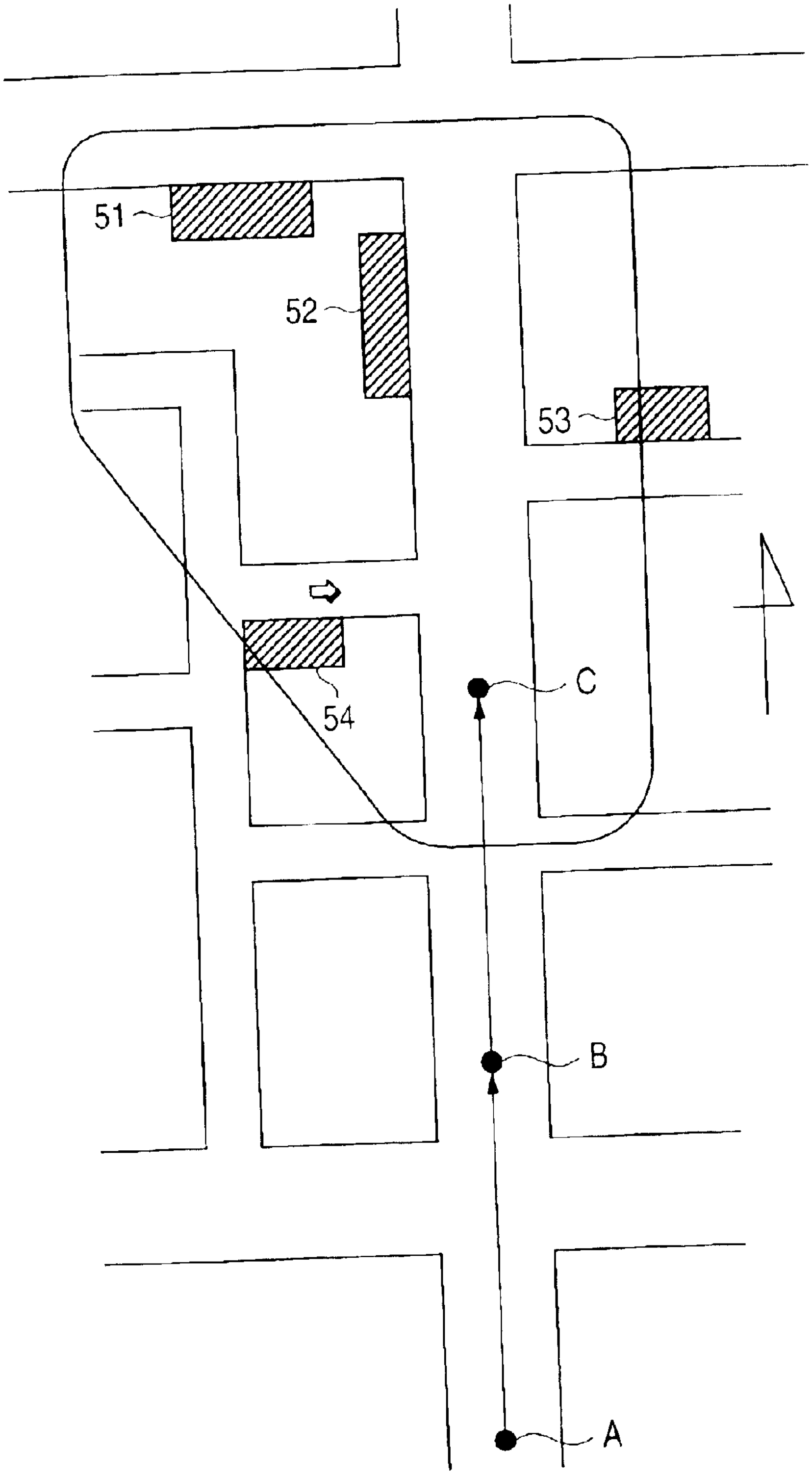
FIG. 12 is a schematic drawing on a map to show reception failure positions in the estimated area of the current position of the client apparatus.
Figure 13:
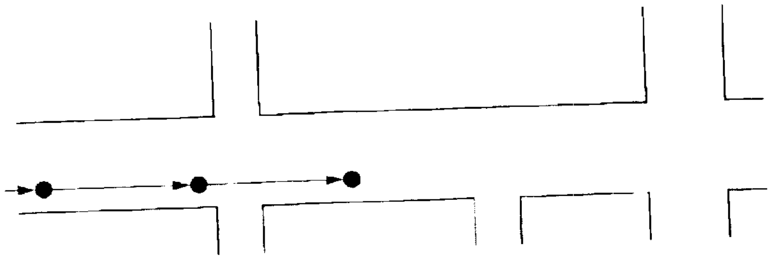
FIG. 13 is a schematic drawing to show result display examples displayed when the position locating system makes a position search.
Figure 13:
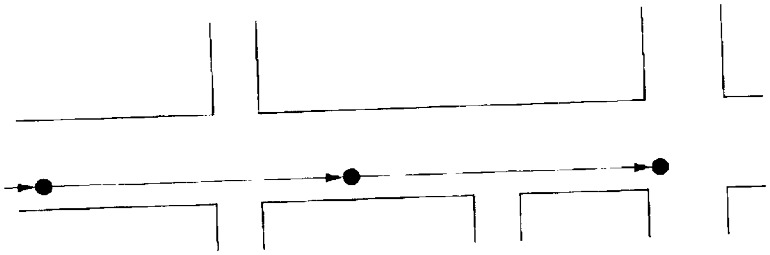
Figure 13:
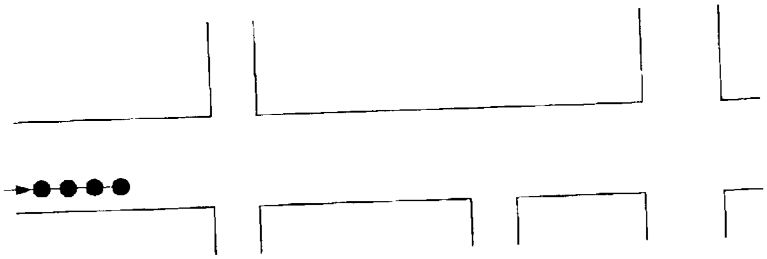

FIG. 12 shows the above-described situation; in this case, the estimated area is expanded in the northwestern direction from the history of the vehicle directed in the north direction on the map considering the possible condition that the probability that the vehicle will go in an opposite direction to the going direction so far is low, the possible condition that the left turn frequency is higher than the right turn frequency, etc.

Next, a search is made for a reception failure position in the calculated area (step S405). Map information concerning reception failure positions is stored in the map information database 22 and thus is used for collation. In the example in FIG. 12, underground parking lot entrances 51 and 52 and parking lots 53 and 54 of dead spaces are found in the area. The found positions may be estimated as the candidates for the current position of the vehicle and be displayed intact or, for example, the distance from the last located position is found (calculated also considering the road conditions of one-way traffic, etc.,), and only the positions at which the client apparatus can arrive in view of the history of the move speed may be extracted and may be sorted in the order of the possibility that the vehicle may exist for display. For example, it can be estimated that the parking lot 54 of the dead space in FIG. 12 is the nearest to the vehicle, but becomes a roundabout route from the last located position (C) because the road that the parking lot 54 faces is one-way traffic, and is hard for the vehicle to arrive at in view of the history of the move speed so far. Therefore, the position estimated as the current position of the vehicle is narrowed down to the underground parking lot 52 or the dead-space parking lot 53. Preferably, the conditions are appropriately incorporated for conducting the estimation; in doing so, the estimation accuracy is also improved.

If no reception failure position is acknowledged in the calculated estimated area, preferably the estimated area is set variably so as to gradually widen the area until a reception failure position is detected (for example, if the area is a circle, the radius is increased little by little). In contrast, if a large number of reception failure positions are acknowledged in the calculated estimated area, preferably the estimated area is set variably so as to gradually shrink the estimated area until the reception failure positions are reduced to an appropriate number of positions (for example, if the area is a circle, the radius is decreased little by little).

Last, the estimation result is transmitted to the information terminal 3 (step S406) and the display section of the information terminal 3 displays a map as shown in FIG. 12, a run history, and information concerning communication-impossible positions and facilities (addresses, facility names, etc.,) (step S407).

The position estimation as described above is effective particularly when the vehicle installing the client apparatus is stolen or when the person carrying the client apparatus is missing. If it is made impossible to locate the position of the vehicle or person being tracked, automatically the current position is estimated, so that the vehicle or person can be easily tracked and the probability of finding out the vehicle or person can be raised.

Although the client apparatus of the position locating system in the embodiment uses the GPS as the position detection means, position locating service in a PHS telephone system or the like may be used to detect the position.

Although the client apparatus of the position locating system in the embodiment uses the vehicle speed sensor as the move speed detection means, the move speed may be calculated from the latitude, longitude difference data of the position information provided by the GPS.

Further, in the position locating system in the embodiment, the map information database storing the map image data, etc., is placed in the server, but may be placed in the position information transmission apparatus (client apparatus) as in a conventional car navigation system. In this case, the acquired position information and the map information of the corresponding position are transmitted from the client apparatus to the server.

In the embodiment, the example wherein the client apparatus is installed in a vehicle has been described, but if a person, an animal, etc., as well as a vehicle carries the client apparatus, similar advantages can be provided, needless to say.

As described above, according to the invention, even if the position information cannot be acquired from the client apparatus whose position is to be located, the server estimates the current position of the client apparatus based on the already acquired position information, so that it is made possible to locate the position of the object.

Also, according to the above-described configuration, the position information is transmitted based on the transmission frequency set in response to the move speed of the mobile unit and thus can be transmitted at the optimum frequency responsive to the move circumstances, so that the server can always acquire constant position information independently of the move circumstances.

What is claimed is:

1. A position locating system comprising:

a client apparatus for detecting current position of the client apparatus and transmitting obtained position information at a predetermined frequency;

an information terminal for transmitting an instruction for searching for the current position of the client apparatus; and a server for receiving the current position search instruction from the information terminal and transmitting map image data containing the current position of the client apparatus to the information terminal based on the position information transmitted from the client apparatus, wherein the server includes a position estimation section for estimating the current position of the client apparatus based on the already acquired position information when the server cannot acquire the position information from the client apparatus and the server requests the client apparatus to transmit position information in response to the search instruction from the information terminal, wherein the server further includes a database, which stores geographic data indicating a reception failure position where there is a possibility that reception of the position information from the client apparatus may stop dead; and wherein the position estimation section estimates the current position of the client apparatus based on the geographic data.

2. The position locating system comprising:

a client apparatus for detecting current position of the client apparatus and transmitting obtained position information at a predetermined frequency;

an information terminal for transmitting an instruction for searching for the current position of the client apparatus; and a server for receiving the current position search instruction from the information terminal and transmitting map image data containing the current position of the client apparatus to the information terminal based on the position information transmitted from the client apparatus, wherein the server includes a position estimation section for estimating the current position of the client apparatus based on the already acquired position information when the server cannot acquire the position information from the client apparatus and the server requests the client apparatus to transmit position information in response to the search instruction from the information terminal, wherein the server further includes a database, which stores geographic data indicating a reception failure position where there is a possibility that reception of the position information from the client apparatus may stop dead, wherein the position estimation section estimates the current position of the client apparatus based on the geographic data, wherein an estimated area where it is estimated that the client apparatus exists is set based on the already acquired position information, and wherein the position estimation section estimates the reception failure position in the estimated area as a candidate for the current position of the client apparatus.

3. The position locating system comprising:

a client apparatus for detecting current position of the client apparatus and transmitting obtained position information at a predetermined frequency;

an information terminal for transmitting an instruction for searching for the current position of the client apparatus; and a server for receiving the current position search instruction from the information terminal and transmitting man image data containing the current position of the client apparatus to the information terminal based on the position information transmitted from the client apparatus, wherein the server includes a position estimation section for estimating the current position of the client apparatus based on the already acquired position information when the server cannot acquire the position information from the client apparatus and the server requests the client apparatus to transmit position information in response to the search instruction from the information terminal, wherein the server further includes a database, which stores geographic data indicating a reception failure position where there is a possibility that reception of the position information from the client apparatus may stop dead, wherein the position estimation section estimates the current position of the client apparatus based on the geographic data, wherein an estimated area where it is estimated that the client apparatus exists is set based on the already acquired position information, wherein the position estimation section estimates the reception failure position in the estimated area as a candidate for the current position of the client apparatus, wherein the position estimation section sets variably the estimated area based on history information up to the most recent position of the client apparatus.

4. A server comprising:

a transmission-reception section for receiving position information from a client apparatus at a predetermined frequency, receiving a position search instruction from an information terminal, and transmitting map image data containing current position of the client apparatus to the information terminal;

a position locating processing section for generating the map image containing the current position of the client apparatus located based on the position information transmitted from the client apparatus;

a position estimation section for generating the map image data containing the current position of the client apparatus estimated based on the already acquired position information when the position information from the client apparatus cannot be acquired and the client apparatus is requested to transmit position information in response to the search instruction from the information terminal; and a database, which stores geographic data indicating a reception failure position where there is a possibility that reception of the position information from the client apparatus may stop dead, wherein the position estimation section estimates the position of the client apparatus based on the geographic data.

5. A server comprising:

a transmission-reception section for receiving position information from a client apparatus at a predetermined frequency, receiving a position search instruction from an information terminal, and transmitting map image data containing current position of the client apparatus to the information terminal;

a position locating processing section for generating the map image containing the current position of the client apparatus located based on the position information transmitted from the client apparatus;

a position estimation section for generating the map image data containing the current position of the client apparatus estimated based on the already acquired position information when the position information from the client apparatus cannot be acquired and the client apparatus is requested to transmit position information in response to the search instruction from the information terminal; and further comprising a database, which stores geographic data indicating a reception failure position where there is a possibility that reception of the position information from the client apparatus may stop dead, wherein the position estimation section estimates the position of the client apparatus based on the geographic data, wherein an estimated area where it is estimated that the client apparatus exists is set based on the already acquired position information, and wherein the position estimation section estimates the reception failure position in the estimated area as a candidate for the current position of the client apparatus.

6. A position locating method comprising the steps of:

requesting a client apparatus to transmit position information in response to current position search instruction;

locating current position of the client apparatus based on the position information transmitted from the client apparatus;

estimating the current position of the client apparatus based on already acquired position information when the client information is requested to transmit the position information in response to the current position search instruction and the position information from the client apparatus cannot be acquired;

transmitting map image data containing the current position of the client apparatus which is located or estimated;

detecting as to whether the position information from the client apparatus cannot be acquired when the client apparatus is requested to transmit position information in response to the current position search instruction; and setting an estimated area where it is estimated that the client apparatus exists based on the already acquired position information, wherein in the estimating step, a reception failure position where there is a possibility that reception of the position information from the client apparatus may stop dead in the estimated area is estimated as a candidate for the current position of the client apparatus.

7. A position locating method comprising the steps of:

requesting a client apparatus to transmit position information in response to current position search instruction;

locating current position of the client apparatus based on the position information transmitted from the client apparatus;

estimating the current position of the client apparatus based on already acquired position information when the client information is requested to transmit the position information in response to the current position search instruction and the position information from the client apparatus cannot be acquired;

transmitting map image data containing the current position of the client apparatus which is located or estimated;

detecting the current position of the client apparatus; and transmitting the obtained position information at a predetermined frequency;

further the comprising the steps of:

detecting as to whether the position information from the client apparatus cannot be acquired when the client apparatus is requested to transmit position information in response to the current position search instruction; and setting an estimated area where it is estimated that the client apparatus exists based on the already acquired position information, wherein in the estimating step, a reception failure position where there is a possibility that reception of the position information from the client apparatus may stop dead in the estimated area is estimated as a candidate for the current position of the client apparatus;

detecting as to whether the position information from the client apparatus cannot be acquired when the client apparatus is requested to transmit position information in response to the current position search instructions; and setting an estimated area where it is estimated that the client apparatus exists based on the already acquired position information, wherein in the estimating step, a reception failure position where there is a possibility that reception of the position information from the client apparatus may stop dead in the estimated area is estimated as a candidate for the current position of the client apparatus.

8. A program embodied on a computer readable medium when executed by a server causes a computer to function as:

a transmission-reception section for receiving position information from a client apparatus at a predetermined frequency and receiving a position search instruction from an information terminal and transmitting map image data containing the current position of the client apparatus to the information terminal;

a position locating processing section for generating the map image data containing the current position of the client apparatus located based on the position information transmitted from the client apparatus; and a position estimation section for generating the map image data containing the current position of the client apparatus estimated based on the already acquired position information when the position information from the client apparatus cannot be acquired and the client apparatus is requested to transmit position information in response to the search instruction from the information terminal, wherein the position estimation section estimates the position of the client apparatus based on geographic data indicating a reception failure position where there is a possibility that reception of the position information from the client apparatus may stop dead.

9. A program embodied on a computer readable medium when executed by a server causes a computer to function as:

a transmission-reception section for receiving position information from a client apparatus at a predetermined frequency and receiving a position search instruction from an information terminal and transmitting map image data containing the current position of the client apparatus to the information terminal;

a position locating processing section for generating the map image data containing the current position of the client apparatus located based on the position information transmitted from the client apparatus; and a position estimation section for generating the ap image data containing the current position of the client apparatus estimated based on the already acquired position information when the position information from the client apparatus cannot be acquired and the client apparatus is requested to transmit position information in response to the search instruction from the information terminal, wherein the position estimation section estimates the position of the client apparatus based on geographic data indicating a reception failure position where there is a possibility that reception of the position information from the client apparatus may stop dead, wherein an estimated area where it is estimated that the client apparatus exists is set based on the already acquired position information, and wherein the position estimation section estimates that the reception failure position in the estimated area is candidate for the current position of the client apparatus.

10. A position information transmission apparatus being installed in a mobile unit, for detecting position of the apparatus and transmitting acquired position information to a server for locating the position of the apparatus, the position information transmission apparatus comprising:

a position information transmission frequency setting section for setting transmission frequency of the position information in response to move speed of the mobile unit, wherein the position information transmission frequency setting section sets the transmission frequency based on time reference responsive to the move speed of the mobile unit, wherein when the move speed of the mobile unit is equal to or higher than predetermined speed, the position information transmission frequency setting section sets the transmission frequency based on the distance reference responsive to the move speed of the mobile unit, wherein when the move speed of the mobile unit is less than the predetermined speed, the position information transmission frequency setting section sets the transmission frequency based on time reference responsive to the move speed of the mobile unit, wherein when the move speed of the mobile unit is equal to or less than a second predetermined speed lower than the predetermined speed, the transmission section immediately transmits the position information accumulated in the accumulation section, and wherein when the move speed of the mobile unit remains the second predetermined speed after the transmission section immediately transmits the position information, the later transmission frequency is set to the frequency set by the position information transmission frequency setting section.

11. The position information transmission apparatus according to claim 10, further comprising:

a position detection section for detecting position information indicating the current position of the mobile unit every predetermined interval;

an accumulation section for accumulating the position information; and a transmission section for transmitting the position information accumulated in the accumulation means to the server based on the transmission frequency set by the position information transmission frequency setting section.

12. The position information transmission apparatus according to claim 11, wherein the transmission section transmits only the position information, which has not been transmitted to the server, of the position information accumulated in the accumulation section.

13. The position information transmission apparatus according to claim 10, wherein the position information transmission frequency setting section sets the transmission frequency based on distance reference responsive to the move speed of the mobile unit.

14. A position information transmission method comprising the steps of:

detecting position of a mobile unit;

transmitting acquired position information to a server for locating the position of the mobile unit;

determining move speed of the mobile unit; and setting transmission frequency of the position information in response to the move speed of the mobile unit, wherein the position information transmission frequency setting section sets the transmission frequency based on time reference responsive to the move speed of the mobile unit, wherein when the move speed of the mobile unit is equal to or higher than predetermined speed, the position information transmission frequency setting section sets the transmission frequency based on the distance reference responsive to the move speed of the mobile unit, wherein when the move speed of the mobile unit is less than the predetermined speed, the position information transmission frequency setting section sets the transmission frequency based on time reference responsive to the move speed of the mobile unit, wherein when the move speed of the mobile unit is equal to or less than a second predetermined speed lower than the predetermined speed, the transmission section immediately transmits the position information accumulated in the accumulation section, and wherein when the move speed of the mobile unit remains the second predetermined speed after the transmission section immediately transmits the position information, the later transmission frequency is set to the frequency set by the position information transmission frequency setting section.

15. The position information transmission method according to claim 14, wherein in the transmission frequency setting step, the transmission frequency is set based on distance reference responsive to the move speed of the mobile unit when the move speed of the mobile unit is equal to or higher than predetermined speed; and the transmission frequency is set based on time reference responsive to the move speed of the mobile unit when the move speed of the mobile unit is less than the predetermined speed.

16. The position information transmission method according to claim 15, further comprising the steps of immediately transmitting the acquired position information when the move speed of the mobile unit is equal to or less than a second predetermined speed lower than the predetermined speed.

17. The position information transmission method according to claim 16, further comprising the steps of setting the later transmission frequency to the frequency set in the transmission frequency setting step when the move speed of the mobile unit remains the second predetermined speed after the position information is immediately transmitted.

18. A program, for detecting the position of a mobile unit and transmitting acquired position information to a server for locating the position of the mobile unit, embodied on a computer readable medium when executed by a computer causes said computer to function as:

a section for determining move speed of the mobile unit; and a section for setting transmission frequency of the position information in response to the move speed of the mobile unit, wherein the position information transmission frequency setting section sets the transmission frequency based on time reference responsive to the move speed of the mobile unit, wherein when the move speed of the mobile unit is equal to or higher than predetermined speed, the position information transmission frequency setting section sets the transmission frequency based on the distance reference responsive to the move speed of the mobile unit, wherein when the move speed of the mobile unit is less than the predetermined speed, the position information transmission frequency setting section sets the transmission frequency based on time reference responsive to the move speed of the mobile unit, wherein when the move speed of the mobile unit is equal to or less than a second predetermined speed lower than the predetermined speed, the transmission section immediately transmits the position information accumulated in the accumulation section, and wherein when the move speed of the mobile unit remains the second predetermined speed after the transmission section immediately transmits the position information, the later transmission frequency is set to the frequency set by the position information transmission frequency setting section.

* * * * *